Patented Oct. 17, 1933

1,931,380

UNITED STATES PATENT OFFICE 1,931,380

PRODUCTION OF TITANIUM DIOXIDE FROM TITANIUM TETRACHLORIDE

Hermann Haber, Elbblick, Aussig on the Elbe, and Paul Kubelka, Aussig on the Elbe, Czechoslovakia, assignors, by mesne assignments, to Krebs Pigment and Color Corporation, Newark, N. J., a corporation of Delaware No Drawing. Application September 3, 1931
Serial No. 561,026

2 Claims. (Cl. 23—202)

This invention relates to titanium dioxide and the manufacture thereof by processes involving hydrolytic splitting of titanium tetrachloride.

It is already known to convert titanium tetrachloride in vaporized state with steam at elevated temperature into titanium dioxide, and by this means a product has been obtained comprising a crystalline fraction detectable under the microscope. Such a product, however, is not particularly suitable for coating purposes, since the coarsely-crystalline particles, once present, cannot be converted by grinding into the fine state of subdivision or distribution required for pigments, and accordingly the process outlined has not been adopted in the paint or pigment arts.

The undesirable qualities of the product hitherto obtained in such ways as the above have been shown by experiments to be due to the fact that titanium dioxide or basic titanium chloride is formed from the reaction vapor mixture before the temperature required for complete splitting is attained, i. e. such compounds are formed during the interval of heating up, and the titanium dioxide or basic titanium chloride under the influence of the hydrochloric acid gas formed during the reaction, is subject to coarsening and crystallization.

The object of this present invention is to obviate the foregoing disadvantage and provide an improved process enabling a very finely divided, soft and uniform titanium dioxide, particularly suitable for pigment purposes to be obtained.

The invention consists in a process for the production of titanium dioxide from vaporized titanium tetrachloride in the presence of steam or water vapor under the action of heat, according to which lower temperature reaction is avoided.

The invention further consists in a process for the production of titanium dioxide from titanium tetrachloride by splitting with steam while heating according to which titanium tetrachloride in the form of vapor and steam are introduced separately into a reaction space heated to a temperature sufficient for effecting the desired splitting reaction.

The invention further consists in a process as set forth according to which the steam and/or the titanium tetrachloride is or are preheated prior to being brought together.

The invention further consists in a process as set forth according to which the splitting or reaction is conducted at temperatures preferably below 500° C. and of the order of 300° C. to 400° C.

The invention also consists in improved processes for the production of titanium dioxide substantially as hereinafter indicated.

The invention further consists in the improved titanium oxide produced in accordance with any of the five preceding paragraphs and if desired calcined.

As a specific example of the method according to this invention the following is given:

In two saturation vessels constructed and operating after the fashion of ordinary wash bottles, one of which is charged with titanium tetrachloride and heated to about 120° C., the other being charged with water and heated to about 80° C. by passing air therethrough, two gaseous streams are produced, which consists of air and titanium tetrachloride or air and steam in a volume ratio of roughly one-to-one in either case. The two streams of gas are preheated to 400° C. and are then introduced separately into the reaction vessel. The latter is conveniently formed by an upright tube of material capable of resisting hydrochloric acid and externally heated to 400° C. The two streams of gas are so proportioned that for each litre of reaction space there are introduced per minute 1 litre of the mixture of steam and air (= 0.5 litre steam) and 0.1 litre of titanium-tetrachloride-air mixture (= 0.05 litre TiCl$_4$ vapor). The vapors are caused to traverse the reaction vessel in a downward direction, and react with one another forming titanium dioxide and hydrogen chloride, thereupon passing into a dust chamber or like collecting means provided under the reaction vessel. The dust chamber or the like is heated to 200° C.–400° C. to inhibit condensation or adsorption of hydrochloric acid on or by the titanium dioxide as same is precipitating. The hydrochloric acid vapors emerging from the dust chamber are condensed in the usual way.

It is understood that the foregoing example is not in any way limitative and that modifications and additions may be introduced. In a general way however it is preferred that the steam prior to the action upon the titanium tetrachloride be preliminarily heated to a high temperature which corresponds to the reaction temperature desired in each case in the reaction chamber. The temperature of the reaction chamber is also regulated as accurately as possible by direct or indirect heating. To assist in the method the titanium tetrachloride can also be preheated to increased temperatures, without any risk of splitting ocurring prematurely.

A further advantage of the new process is that the complete splitting of the titanium tetrachloride can be carried out at a lower temperature than previously. For example even at a decomposition temperature of 300° C., splitting products which are practically entirely free from chloride are obtained in almost quantitative yield, which can be further improved if desired by subsequent heating and grinding. The covering power and pigmentary power of the titanium dioxide as well as the other properties of importance in painting are so substantially increased by an even slight increase in this splitting temperature that subsequent calcination can as a general rule be dispensed with. For instance pigments which have been separated at 380° C–400° C. display a covering power and pigmentary power approximately similar to those of products hydrolyzed from titanium sulphate solutions and calcined at about 900° C.

Having now particularly described and ascertained the nature of our said invention and in what manner the same is to be performed, what is claimed is:

1. In a process for the production of titanium dioxide, the step which comprises reacting vaporized titanium tetrachloride with steam at temperatures of 300° to 400° C.

2. In a process for the production of titanium dioxide, the steps which comprise separately preheating titanium tetrachloride and steam to temperatures ranging from 300 to 500° C. and introducing said preheated materials into a reaction space heated to a temperature ranging from 300 to 500° C.

HERMANN HABER.
PAUL KUBELKA.